United States Patent
Umeyama et al.

(10) Patent No.: US 9,741,988 B2
(45) Date of Patent: Aug. 22, 2017

(54) NON-AQUEOUS ELECTROLYTE SECONDARY BATTERY AND METHOD OF MANUFACTURING THE SAME

(71) Applicant: TOYOTA JIDOSHA KABUSHIKI KAISHA, Toyota-shi, Aichi-ken (JP)

(72) Inventors: Hiroya Umeyama, Okazaki (JP); Harunari Shimamura, Toyonaka (JP); Yusuke Fukumoto, Toyonaka (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/044,172

(22) Filed: Feb. 16, 2016

(65) Prior Publication Data

US 2016/0293922 A1  Oct. 6, 2016

(30) Foreign Application Priority Data

Mar. 30, 2015  (JP) ................. 2015-068642

(51) Int. Cl.
*H01M 2/16* (2006.01)
*H01M 2/14* (2006.01)
*H01M 10/052* (2010.01)
*H01M 10/0585* (2010.01)

(52) U.S. Cl.
CPC ......... *H01M 2/1673* (2013.01); *H01M 2/145* (2013.01); *H01M 2/166* (2013.01); *H01M 2/1686* (2013.01); *H01M 10/052* (2013.01); *H01M 10/0585* (2013.01)

(58) Field of Classification Search
CPC .......... H01M 10/052; H01M 10/0585; H01M 2/145; H01M 2/166; H01M 2/1673; H01M 2/1686
See application file for complete search history.

(56) References Cited

U.S. PATENT DOCUMENTS

| | | |
|---|---|---|
| 2013/0202944 A1 | 8/2013 | Song et al. |
| 2013/0244116 A1 | 9/2013 | Watanabe et al. |
| 2014/0170508 A1* | 6/2014 | Nagata .................. H01M 12/02 429/403 |

FOREIGN PATENT DOCUMENTS

| | | |
|---|---|---|
| JP | 2000-251944 A | 9/2000 |
| JP | 2013-161784 A | 8/2013 |
| JP | 2013-191550 A | 9/2013 |

* cited by examiner

*Primary Examiner* — Patrick Ryan
*Assistant Examiner* — Ben Lewis
(74) *Attorney, Agent, or Firm* — Sughrue Mion, PLLC

(57) ABSTRACT

A non-aqueous electrolyte secondary battery includes a separator including a base material and a heat resistance layer formed on at least one main surface of the base material and containing inorganic particles and a resin binder. The non-aqueous electrolyte secondary battery further includes an electrode composite material layer stacked on the heat resistance layer and containing electrode active material particles and an interposed layer interposed between the heat resistance layer and the electrode composite material layer. In the interposed layer, the inorganic particles, the resin binder, and the electrode active material particles are present as being mixed. A ratio of a thickness of the interposed layer to a thickness of the base material is not lower than 1% and not higher than 5%.

3 Claims, 9 Drawing Sheets

NON-AQUEOUS ELECTROLYTE SECONDARY BATTERY AND METHOD OF MANUFACTURING THE SAME

This nonprovisional application is based on Japanese Patent Application No. 2015-068642 filed with the Japan Patent Office on Mar. 30, 2015, the entire contents of which are hereby incorporated by reference.

BACKGROUND OF THE INVENTION

Field of the Invention

The present invention relates to a non-aqueous electrolyte secondary battery and a method of manufacturing the same.

Description of the Background Art

Japanese Patent Laying-Open No. 2000-251944 discloses a non-aqueous electrolyte secondary battery in which a separator and an electrode composite material layer adhere to each other with an adhesive polymer.

SUMMARY OF THE INVENTION

A separator serves as a partition wall for maintaining a prescribed distance between electrodes and also as a liquid holding material for holding an electrolyte solution between the electrodes. An electrode composite material layer in contact with the separator expands and contracts with charging and discharging reaction of a battery. Therefore, when charging and discharging is repeated, an adhesive state between the separator and the electrode composite material layer is impaired, the distance between the electrodes is varied, and in addition, distribution of the electrolyte solution held between the electrodes is also varied. Electrode reaction thus becomes non-uniform and local deterioration proceeds, which may lead to lowering in battery performance.

By using an adhesive polymer as in Japanese Patent Laying-Open No. 2000-251944, an effect to maintain an adhesive state between the separator and the electrode composite material layer can be expected. In consideration of an application where a high load current is produced, however, adhesiveness is not yet sufficient.

Magnitude of a load current is expressed by a multiple of an amount of current 1 C, which represents an amount of current with which a rated capacity of a battery is fully discharged in 1 hour. A maximum load required of a consumer small battery is at most approximately from 1 to 3 C. A large power battery represented, for example, by a battery for a vehicle, however, requires an extremely high load current exceeding 10 C. When charging and discharging is carried out under such a high load, change in volume of the electrode composite material layer is also abrupt. Therefore, even though the separator and the electrode composite material layer adhere to each other with an adhesive polymer, adhesiveness may lower and battery performance may lower with repeated charging and discharging.

Therefore, an object of the present invention is to provide a non-aqueous electrolyte secondary battery excellent in durability under high-load charging and discharging.

[1] A non-aqueous electrolyte secondary battery includes a separator including a base material and a heat resistance layer formed on at least one main surface of the base material and containing inorganic particles and a resin binder. The non-aqueous electrolyte secondary battery further includes an electrode composite material layer stacked on the heat resistance layer and containing electrode active material particles and an interposed layer interposed between the heat resistance layer and the electrode composite material layer. In the interposed layer, the inorganic particles, the resin binder, and the electrode active material particles are present as being mixed. A ratio of a thickness of the interposed layer to a thickness of the base material is not lower than 1% and not higher than 5%.

The non-aqueous electrolyte secondary battery includes a separator with a heat resistance layer (HRL). The heat resistance layer is a surface layer containing a material higher in melting point than a base material (for example, a microporous film made of a polyolefin resin). In the non-aqueous electrolyte secondary battery, the heat resistance layer and the electrode composite material layer are in a state continuous in terms of structure and composition. Namely, the interposed layer in which the inorganic particles and the resin binder representing components of the heat resistance layer and the electrode active material particles representing a component of the electrode composite material layer are present as being mixed is formed between the heat resistance layer and the electrode composite material layer. In the presence of the interposed layer, the separator and the electrode composite material layer are firmly bonded to each other so that adhesiveness allowing resistance also to repeated high-load charging and discharging is realized.

The interposed layer is formed as the heat resistance layer and the electrode composite material layer enter each other by applying a pressure in a direction of stack of the heat resistance layer and the electrode composite material layer during manufacturing of the non-aqueous electrolyte secondary battery. As will further be described later, adhesiveness between the separator and the electrode composite material layer can also be made higher by holding the stack of the separator and the electrode composite material layer under a prescribed pressure and temperature condition after the interposed layer is formed.

A thickness of the interposed layer is defined by an interval between a first straight line in contact with a tip end of the electrode active material particles protruding most toward the heat resistance layer in the direction of stack of the heat resistance layer and the electrode composite material layer and orthogonal to the direction of stack and a second straight line in contact with a tip end of the inorganic particles or the resin binder protruding most toward the electrode composite material layer and orthogonal to the direction of stack.

When a ratio of the thickness of the interposed layer to the thickness of the base material of the separator is lower than 1%, in spite of formation of the interposed layer, partial separation may be caused by repeated high-load charging and discharging. When the ratio exceeds 5%, the interposed layer may block permeation of lithium (Li) ions, which may lead to lowering in high-load charging and discharging characteristics. Therefore, in the non-aqueous electrolyte secondary battery, the ratio of the thickness of the interposed layer to the thickness of the base material is restricted to be not lower than 1% and not higher than 5%.

In [1] above, the electrode composite material layer refers to at least one of a positive electrode composite material layer and a negative electrode composite material layer. When the electrode composite material layer is the positive electrode composite material layer, the electrode active material particles refer to positive electrode active material particles. When the electrode composite material layer is the negative electrode composite material layer, the electrode active material particles refer to negative electrode active material particles. Namely, in [1] above, the heat resistance layer and the interposed layer may be formed between the base material and the positive electrode composite material layer or between the base material and the negative electrode composite material layer. Furthermore, the heat resistance layer and the interposed layer may be formed between the base material and the positive electrode composite material layer and between the base material and the negative electrode composite material layer.

[2] The inorganic particles preferably include an angular protruding portion of which interior angle is not smaller than 10° and not greater than 90°. The heat resistance layer preferably contains 30 mass % or more and 70 mass % or less of the resin binder.

The inorganic particles include the angular protruding portion, so that the heat resistance layer and the electrode composite material layer are likely to enter each other. When the ratio of the resin binder is within the range above, balance between adhesiveness and high-load charging and discharging characteristics is good.

[3] A method of manufacturing a non-aqueous electrolyte secondary battery preferably includes the steps of stacking the electrode composite material layer on the heat resistance layer and holding a stack of the heat resistance layer and the electrode composite material layer in an environment at a temperature not lower than 80° C. and not higher than 120° C. while a pressure not lower than 8 MPa and not higher than 20 MPa is applied in a direction of stack of the heat resistance layer and the electrode composite material layer. With this manufacturing method, the interposed layer is fixed and improvement in adhesiveness can be expected.

The foregoing and other objects, features, aspects and advantages of the present invention will become more apparent from the following electrode assembled description of the present invention when taken in conjunction with the accompanying drawings.

DESCRIPTION OF THE PREFERRED EMBODIMENTS

Though one example of an embodiment of the present invention (hereinafter denoted as the "present embodiment") will be described hereinafter, the present embodiment is not limited thereto. In the description below, a non-aqueous electrolyte secondary battery may simply be denoted as a "battery".

[Non-Aqueous Electrolyte Secondary Battery]

Figure 1:
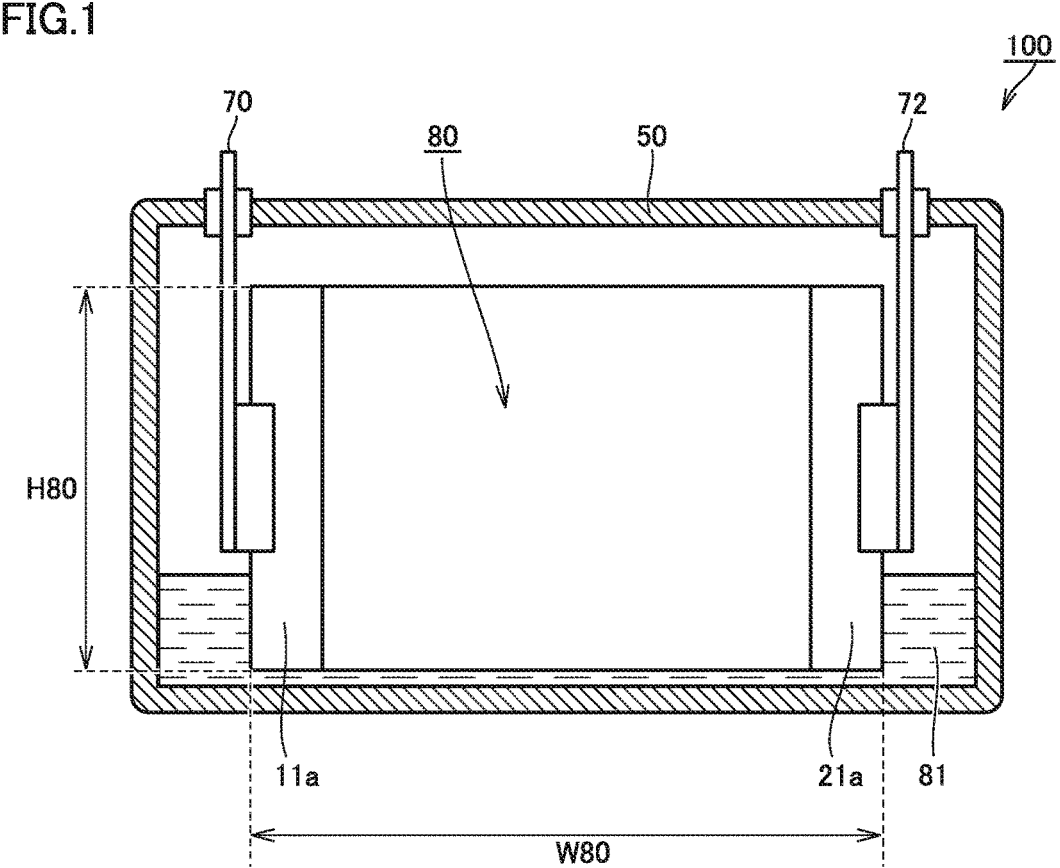
FIG. 1 is a schematic cross-sectional view showing one example of a construction of a non-aqueous electrolyte secondary battery according to an embodiment of the present invention.

FIG. 1 is a schematic cross-sectional view showing one example of a construction of a non-aqueous electrolyte secondary battery according to the present embodiment. As shown in FIG. 1, a battery 100 includes a prismatic case 50. Prismatic case 50 is made, for example, of an aluminum (Al) alloy. The exterior of the battery is not limited to such a hard case, but may be, for example, an Al-laminated exterior. Prismatic case 50 is provided with a positive electrode terminal 70 and a negative electrode terminal 72 which are external terminals. Prismatic case 50 may further be provided with a current interrupt device, a safety valve, and a liquid injection port. Battery 100 contains an electrode assembly 80 and an electrolyte solution 81. The electrolyte solution permeates also into the inside of electrode assembly 80.

[Electrode Assembly]

Figure 2:
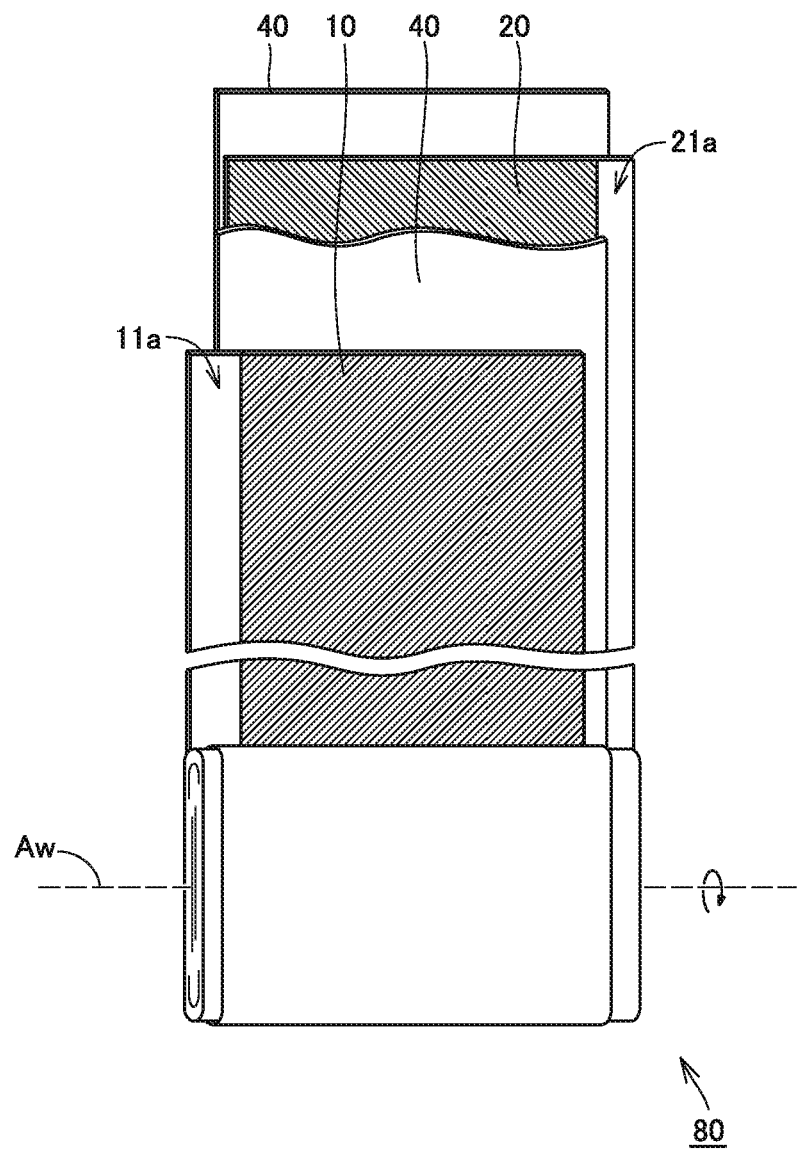
FIG. 2 is a schematic diagram showing one example of a construction of an electrode assembly.

FIG. 2 is a schematic diagram showing one example of a construction of the electrode assembly. Electrode assembly 80 shown in FIG. 2 exhibits a flat profile. Electrode assembly 80 is a wound electrode assembly. Namely, electrode assembly 80 is an assembly of electrodes obtained by stacking and winding a band-shaped positive electrode plate 10 and a band-shaped negative electrode plate 20 with a band-shaped separator 40 lying therebetween. The electrode assembly in the present embodiment may be, for example, a stack-type assembly of electrodes. Namely, the electrode assembly may be an assembly of electrodes obtained by stacking a plurality of electrode units, each of which is formed by stacking a rectangular positive electrode plate and a rectangular negative electrode plate with a rectangular separator lying therebetween.

[Separator]

A separator includes a base material and a heat resistance layer. The base material may be a microporous film composed, for example, of polyethylene (PE) or polypropylene (PP). The base material may be formed of a single layer or a plurality of layers. For example, the base material may have a single-layered structure formed from a PE microporous film, a two-layered structure in which a PE microporous film and a PP microporous film are stacked, or a three-layered structure in which a PP microporous film, a PE microporous film, and a PP microporous film are stacked in this order. A pore diameter and a porosity of the microporous film are desirably adjusted as appropriate such that air permeability attains to a desired value.

The base material has a thickness, for example, approximately not smaller than 5 μm and not greater than 50 μm. The lower limit of the thickness of the base material may be 10 μm or 15 μm. The upper limit of the thickness of the base material may be 30 μm or 25 μm.

The heat resistance layer is formed on at least one main surface of the base material. The heat resistance layer may be formed on both main surfaces of the base material. The heat resistance layer has a thickness, for example, not smaller than 0.5 μm and not greater than 7 μm and preferably not smaller than 0.5 μm and not greater than 5 μm. When the heat resistance layer has a thickness not smaller than 0.5 μm, improvement in short-circuiting prevention performance can be expected. When the heat resistance layer has a thickness not greater than 5 μm, suppression of lowering in ion permeability can be expected. The lower limit of the thickness of the heat resistance layer is more preferably 0.8 μm. The upper limit of the thickness of the heat resistance layer is more preferably 4.2 μm.

The heat resistance layer contains inorganic particles and a resin binder. The inorganic particles may be made of an inorganic compound such as α alumina (α $Al_2O_3$), boehmite (AlOOH), titania ($TiO_2$), zirconia ($ZrO_2$), and magnesia (MgO). The heat resistance layer may contain two or more types of inorganic particles. The inorganic particles may have powder property, for example, as follows.

α alumina: d50 from 0.2 to 1.2 μm, BET from 1.3 to 50 $m^2/g$ boehmite: d50 from 0.2 to 1.8 μm, BET from 2.8 to 50 $m^2/g$ titania: d50 from 0.2 to 1.0 μm, BET from 2.0 to 50 $m^2/g$
zirconia: d50 from 0.2 to 1.0 μm, BET from 2.0 to 50 $m^2/g$
magnesia: d50 from 0.2 to 1.0 μm, BET from 2.0 to 50 $m^2/g$ Here, "d50" represents a particle size (a median diameter) at an integrated value 50% in volume-based particle size distribution obtained with a laser diffraction scattering method. "BET" represents a specific surface area measured with the BET method.

The inorganic particles preferably include an angular protruding portion of which interior angle is not smaller than 10° and not greater than 90°. The inorganic particles including the angular protruding portion can be obtained by crushing the inorganic particles, for example, with the use of a crusher such as a jet mill. As the inorganic particles include such an angular protruding portion, entry of the inorganic particles into the electrode composite material layer is more likely and formation of an interposed layer which will be described later is facilitated. The inorganic particles may include a plurality of angular protruding portions.

An interior angle of the angular protruding portion can be measured, for example, as follows. A contour of a particle is drawn by observing the inorganic particle under an electron microscope (SEM) and projecting an outer geometry of the particle on a two-dimensional plane. Whether or not there is an angular protruding portion on the contour is checked. An interior angle of a vertex of the angular protruding portion is measured and it can be defined as the interior angle of the angular protruding portion. The interior angle of the angular protruding portion included in the contour of the inorganic particle is more preferably not smaller than 30° and not greater than 90° and particularly preferably not smaller than 45° and not greater than 90°.

The heat resistance layer contains a resin binder together with the inorganic particles. A ratio of the resin binder in the heat resistance layer is preferably not lower than 30 mass % and not higher than 70 mass %. Namely, the heat resistance layer contains preferably 30 mass % or more and 70 mass % or less of the resin binder and contains the inorganic particles as the remainder. When the ratio of the resin binder is within the range above, balance between adhesiveness and high-load charging and discharging characteristics is good. The lower limit of the ratio of the resin binder is more preferably 40 mass %. The upper limit of the ratio of the resin binder is more preferably 60 mass %.

The resin binder may be made, for example, of a polyvinylidene difluoride (PVDF) resin, a copolymer (PVDF-HFP) resin of PVDF and hexafluoropropylene (HFP), a polytetrafluoroethylene (PTFE) resin, an acrylic resin, an aramid-based resin, a polyacrylonitrile (PAN) resin, and a mixture or a copolymer thereof.

The heat resistance layer preferably contains a PVDF resin. The PVDF resin is likely to swell, and therefore an effect to suppress lowering in ion permeability with formation of the heat resistance layer can be expected. The PVDF resin has a weight average molecular weight, for example, approximately from 1000 to 1000000. The heat resistance layer may contain two or more types of resin binders. When the heat resistance layer contains two or more types of resin binders, suitable combination thereof includes a two-type mixture of the PVDF resin and the PVDF-HFP resin and a three-type mixture of the PVDF resin, the PVDF-HFP resin, and the PTFE resin. A ratio of mixing is not particularly limited. For example, the same amount of each component can be mixed for use.

The acrylic resin is a resin obtained, for example, by polymerizing polymeric monomers having a (meth)acryloyl group, such as (meth)acrylic acid or (meth)acrylic ester. The acrylic resin may be a homopolymer or a copolymer. The acrylic resin may be a modified acrylic resin of which part has been modified. Here, "(meth)acryl" refers to at least any of acryl and methacryl and "(meth)acryloyl" refers to at least any of acryloyl and methacryloyl.

The aramid-based resin is a resin obtained by condensation polymerization between aromatic polyamine and aromatic polycarboxylic acid. Examples of aromatic polyamine include p-phenylenediamine. Examples of aromatic polycarboxylic acid include terephthalic acid. For example, carboxylic acid chloride such as terephthaloyl dichloride may be employed. The aramid-based resin may be meta-aramid or para-aramid. Since the aramid-based resin is excellent in resistance to heat, improvement in safety can be expected.

[Positive Electrode Plate]

Figure 3:
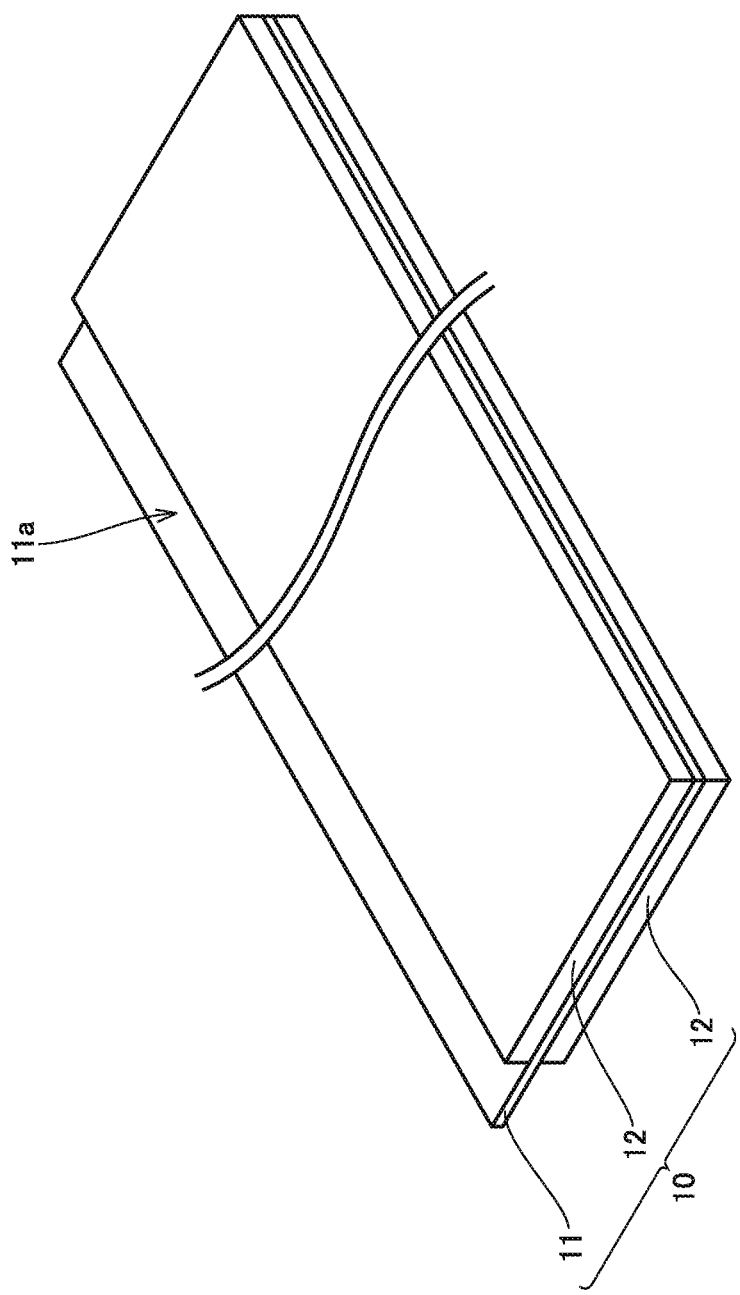
FIG. 3 is a schematic diagram showing one example of a construction of a positive electrode plate.

FIG. 3 is a schematic diagram showing one example of a construction of the positive electrode plate. As shown in FIG. 3, positive electrode plate 10 includes a positive electrode current collection foil 11 and a positive electrode composite material layer 12 formed on both main surfaces of positive electrode current collection foil 11. For example, an Al foil is employed for the positive electrode current collection foil. The positive electrode current collection foil has a thickness, for example, approximately from 5 to 30 μm. In positive electrode plate 10, a foil exposure portion 11a where positive electrode current collection foil 11 is exposed through positive electrode composite material layer 12 serves as a site of connection to positive electrode terminal 70 (see FIGS. 1 and 2).

The positive electrode composite material layer has a thickness, for example, approximately not smaller than 25 μm and not greater than 85 μm. The positive electrode composite material layer contains positive electrode active material particles. The positive electrode active material particles are, for example, particles composed of Li-containing metal oxide. Examples of the Li-containing metal oxide include $LiCoO_2$, $LiNiO_2$, a compound expressed by a general formula $LiNi_aCo_bO_2$ (where a+b=1, 0<a<1, 0<b<1), $LiMnO_2$, $LiMn_2O_4$, a compound expressed by a general formula $LiNi_aCo_bMn_cO_2$ (where a+b+c=1, 0<a<1, 0<b<1, 0<c<1), and $LiFePO_4$. Here, examples of the compound expressed by the general formula $LiNi_aCo_bMn_cO_2$ include $LiNi_{1/3}Co_{1/3}Mn_{1/3}O_2$. The positive electrode active material particles have d50, for example, approximately from 1 to 20 μm. A ratio occupied by the positive electrode active material particles in the positive electrode composite material layer is, for example, approximately from 80 to 98 mass %.

The positive electrode composite material layer may further contain a conductive material and a resin binder for positive electrode. The conductive material may be, for example, carbon black such as acetylene black (AB) or thermal black. A ratio occupied by the conductive material in the positive electrode composite material layer is, for example, approximately from 1 to 10 mass %. The resin binder for positive electrode may be made, for example, of the PVDF resin or the PTFE resin. A ratio occupied by the resin binder for positive electrode in the positive electrode composite material layer is, for example, approximately from 1 to 10 mass %.

[Interposed Layer]

Figure 4:
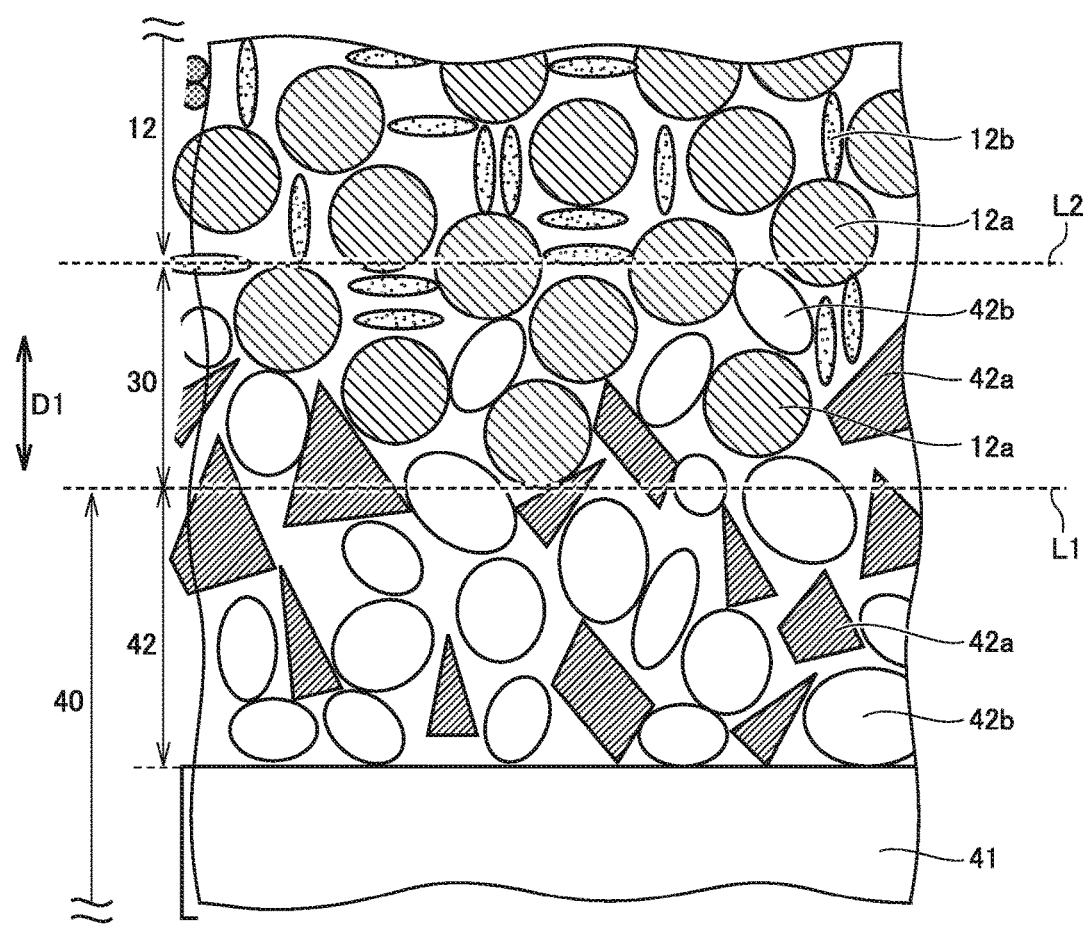
FIG. 4 is a schematic cross-sectional view illustrating an interposed layer.

In the present embodiment, an interposed layer is formed between the heat resistance layer and the electrode composite material layer. FIG. 4 is a schematic cross-sectional view illustrating the interposed layer. A cross-section shown in FIG. 4 is a cross-section along a direction of stack D1 of the heat resistance layer and the electrode composite material layer. FIG. 4 shows by way of example that the heat resistance layer is opposed to the positive electrode composite material layer and the interposed layer is formed between the heat resistance layer and the positive electrode composite material layer.

The cross-sectional image shown in FIG. 4 is obtained, for example, by collectively cutting the separator and the positive electrode plate along direction of stack D1 and observing the cut surface with an SEM. A magnification for observation with the SEM is, for example, approximately from 10000× to 50000×. The cut surface is desirably in parallel to direction of stack D1, however, it does not have to be exactly in parallel thereto. For example, the cut surface may be inclined by approximately ±10° from direction of stack D1. Prior to observation, the cut surface is desirably subjected to smoothing treatment with a cross-section polisher or a focused ion beam apparatus.

As shown in FIG. 4, separator 40 includes a base material 41 and a heat resistance layer 42 formed on base material 41. Heat resistance layer 42 contains inorganic particles 42a and a resin binder 42b. Positive electrode composite material layer 12 contains positive electrode active material particles 12a and a conductive material 12b. An interposed layer 30 is formed between heat resistance layer 42 and positive electrode composite material layer 12. In interposed layer 30, inorganic particles 42a, resin binder 42b, positive electrode active material particles 12a, and conductive material 12b are present as being mixed. The separator and the positive electrode composite material layer are thus firmly bonded to each other.

A first straight line L1 shown in FIG. 4 is a straight line in contact with a tip end of positive electrode active material particles 12a protruding most toward heat resistance layer 42 and orthogonal to direction of stack D1. A second straight line L2 is a straight line in contact with a tip end of inorganic particles 42a or resin binder 42b protruding most toward positive electrode composite material layer 12 (resin binder 42b in FIG. 4) and orthogonal to direction of stack D1. In the present embodiment, an interval between first straight line L1 and second straight line L2 is defined as a thickness of interposed layer 30.

A ratio of a thickness of interposed layer 30 to a thickness of base material 41 is not lower than 1% and not higher than 5%. For example, when the base material has a thickness of 20 μm, the interposed layer has a thickness not smaller than 200 nm and not greater than 1 μm. Thus, adhesiveness between heat resistance layer 42 and positive electrode composite material layer 12 and high-load charging and discharging characteristics can both be achieved. The lower limit of the ratio is preferably 2.0%, more preferably 2.1%, and particularly preferably 2.3%. The upper limit of the ratio is preferably 4.5%, more preferably 3.3%, and particularly preferably 3.2%. When the ratio is within these ranges, improvement in adhesiveness and the high-load charging and discharging characteristics can be expected.

[Negative Electrode Plate]

Figure 5:
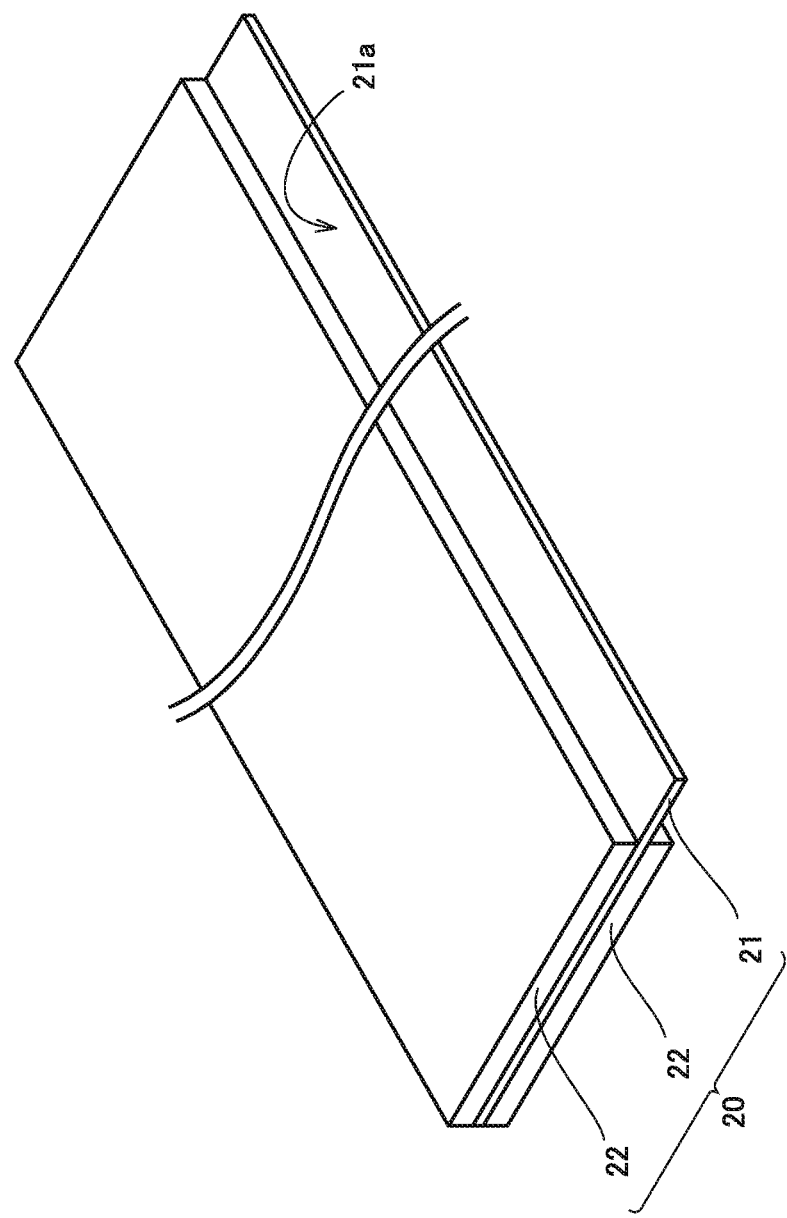
FIG. 5 is a schematic diagram showing one example of a construction of a negative electrode plate.

FIG. 5 is a schematic diagram showing one example of a construction of the negative electrode plate. As shown in FIG. 5, negative electrode plate 20 includes a negative electrode current collection foil 21 and a negative electrode composite material layer 22 formed on both main surfaces of negative electrode current collection foil 21. For example, a copper (Cu) foil is employed as the negative electrode current collection foil. The negative electrode current collection foil has a thickness, for example, approximately from 5 to 30 μm. In negative electrode plate 20, a foil exposure portion 21a where negative electrode current collection foil 21 is exposed through negative electrode composite material layer 22 serves as a site of connection to negative electrode terminal 72 (see FIGS. 1 and 2).

The negative electrode composite material layer has a thickness, for example, approximately not smaller than 20 μm and not greater than 70 μm. The negative electrode composite material layer contains negative electrode active material particles. The negative electrode active material particles are not particularly restricted. The negative electrode active material particles may be, for example, particles composed of a carbon-based negative electrode active material such as graphite, amorphous coated graphite, or coke, or particles composed of an alloy-based negative electrode active material containing silicon (Si) or tin (Sn). Here, amorphous coated graphite refers to a material in which a surface of particulate graphite is coated with amorphous carbon. The negative electrode active material particles have d50, for example, approximately from 1 to 20 μm. A ratio occupied by the negative electrode active material particles in the negative electrode composite material layer is, for example, approximately from 95 to 99 mass %.

The negative electrode composite material layer may further contain a thickener and a resin binder for negative electrode. The thickener may be made, for example, of sodium (Na) salt of carboxymethylcellulose (CMC). A ratio occupied by the thickener in the negative electrode composite material layer is, for example, approximately from 0.5 to 2.5 mass %. The resin binder for negative electrode may be made, for example, of styrene-butadiene rubber (SBR). A ratio occupied by the resin binder for negative electrode in the negative electrode composite material layer is approximately from 0.5 to 2.5 mass %.

A capacity of the positive electrode and a capacity of the negative electrode are adjusted based on a type and an amount of prepared active material particles. In the present embodiment, a ratio of the capacity of the negative electrode to the capacity of the positive electrode (=capacity of negative electrode÷capacity of positive electrode) may be, for example, approximately from 1.7 to 2.0.

[Electrolyte Solution]

An electrolyte solution is a liquid electrolyte obtained by dissolving a supporting electrolyte in an aprotic solvent. The aprotic solvent includes, for example, cyclic carbonates such as ethylene carbonate (EC), propylene carbonate (PC), butylene carbonate (BC), and γ-butyrolactone (γBL) and chain carbonates such as dimethyl carbonate (DMC), ethyl methyl carbonate (EMC), and diethyl carbonate (DEC). Two or more of these aprotic solvents may be mixed to obtain a mixed solvent. A volume ratio between the cyclic carbonate and the chain carbonate in the mixed solvent may be, for example, cyclic carbonate:chain carbonate=1:9 to 5:5. In such a range, balance between electric conductivity and electrochemical stability is good.

A supporting electrolyte includes, for example, $LiPF_6$, $LiBF_4$, $LiClO_4$, $LiAsF_6$, $Li[(FSO_2)_2N]$ (which may also be abbreviated as "LiFSI"), $Li[(CF_3SO_2)_2N]$ (which may also be abbreviated as "LiTFSI"), and $Li[CF_3SO_3]$. The electrolyte solution may contain two or more types of supporting electrolyte. $LiPF_6$ and LiFSI are particularly suitable as the supporting electrolyte in the present embodiment. A concentration of the supporting electrolyte is preferably approximately from 0.5 to 2.0 mol/L, more preferably approximately from 0.8 to 1.4 mol/L, and particularly preferably approximately from 1.0 to 1.2 mol/L. Balance between storage characteristics and high-load charging and discharging characteristics is good in such a range.

Other than the component above, the electrolyte solution may further contain Li salt having as anion, such an oxalate complex as $Li[(C_2O_4)_2B]$ (which may also be abbreviated as "LiBOB"), $Li[(C_2O_4)BF_2]$, and $Li[(C_2O_4)_2PF_2]$, as well as vinylene carbonate (VC), fluoroethylene carbonate (FEC), ethylene sulfite (ES), propane sultone (PS), $Li[PO_2F_2]$, cyclohexylbenzene (CHB), and biphenyl (BP).

[Method of Manufacturing Non-Aqueous Electrolyte Secondary Battery]

Figure 6:
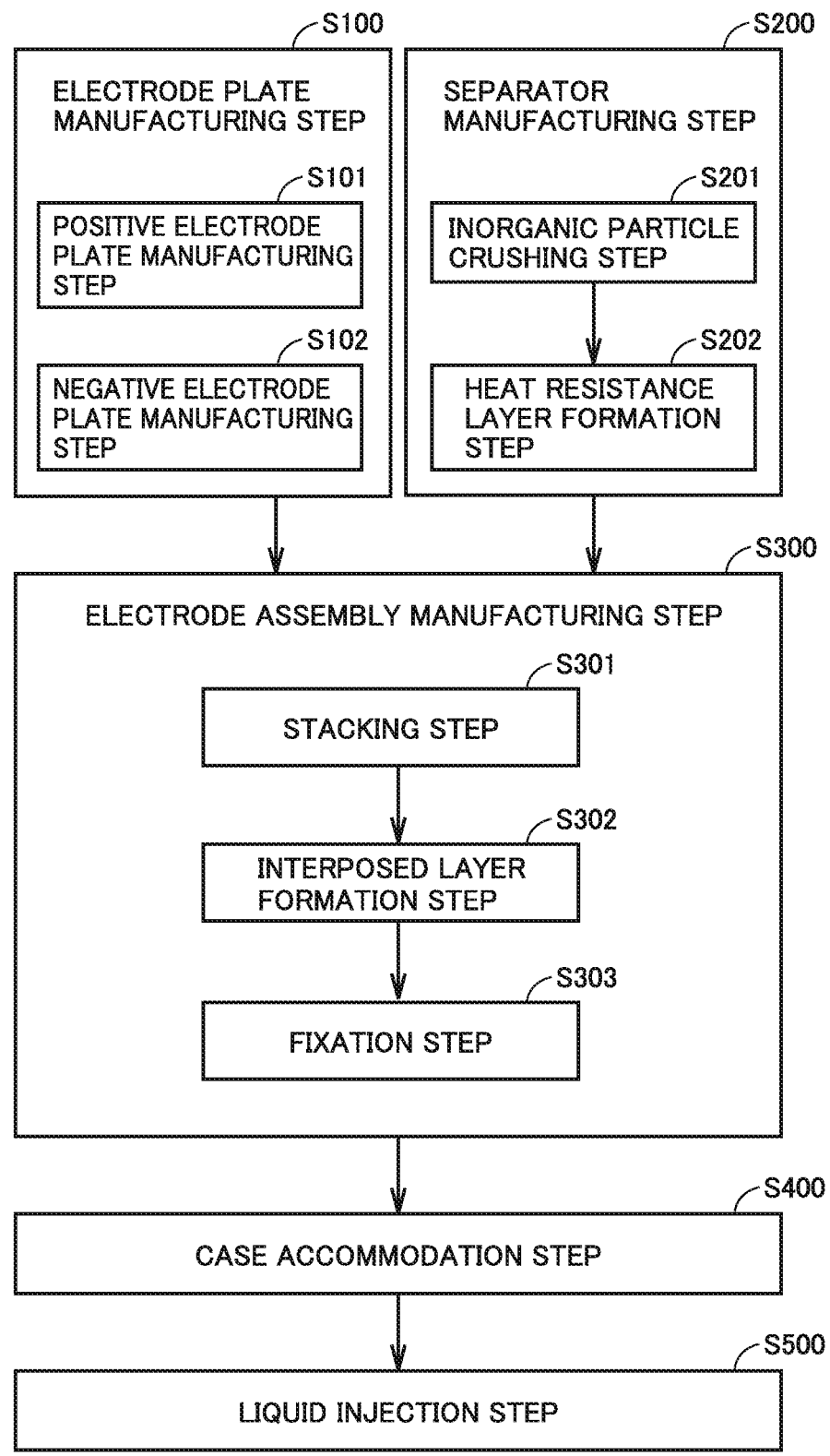
FIG. 6 is a flowchart showing overview of a method of manufacturing a non-aqueous electrolyte secondary battery according to the present embodiment.

The non-aqueous electrolyte secondary battery according to the present embodiment described above can be manufactured, for example, with a method as follows. FIG. 6 is a flowchart showing overview of a method of manufacturing a non-aqueous electrolyte secondary battery according to the present embodiment. As shown in FIG. 6, the manufacturing method includes an electrode plate manufacturing step (S100), a separator manufacturing step (S200), an electrode assembly manufacturing step (S300), a case accommodation step (S400), and a liquid injection step (S500). Among these, the electrode assembly manufacturing step (S300) includes a stacking step (S301), an interposed layer formation step (S302), and a fixation step (S303). Namely, the method of manufacturing a non-aqueous electrolyte secondary battery in the present embodiment includes at least the stacking step (S301) and the fixation step (S303). Each step will be described below.

[Electrode Plate Manufacturing Step (S100)]

The electrode plate manufacturing step includes a positive electrode plate manufacturing step (S101) and a negative electrode plate manufacturing step (S102).

1. Positive Electrode Plate Manufacturing Step (S101)

In the positive electrode plate manufacturing step, for example, positive electrode plate 10 shown in FIG. 3 is manufactured. Positive electrode plate 10 can be manufactured with a conventionally known method. Positive electrode plate 10 is manufactured, for example, as follows.

(1) A positive electrode composite material paste is fabricated by mixing and kneading positive electrode active material particles, a conductive material, and a resin binder for positive electrode together with a solvent with the use of a kneader mixer. For example, N-methyl-2-pyrrolidone (NMP) is employed as the solvent. For example, a planetary mixer may be employed as the kneader mixer.

(2) Both main surfaces of a positive electrode current collection foil are coated with the positive electrode composite material paste with the use of a die coater, followed by drying. The positive electrode composite material layer is thus formed.

(3) The positive electrode composite material layer is compressed with the use of a rolling machine. A thickness and a density of the positive electrode composite material layer are thus adjusted.

(4) The positive electrode current collection foil and the positive electrode composite material layer are cut into a prescribed dimension with the use of a slitter. 2. Negative Electrode Plate Manufacturing Step (S102)

In the negative electrode plate manufacturing step, for example, negative electrode plate 20 shown in FIG. 5 is manufactured. Negative electrode plate 20 can be manufactured with a conventionally known method. Negative electrode plate 20 is manufactured, for example, as follows.

(1) A negative electrode composite material paste is fabricated by mixing and kneading negative electrode active material particles, a thickener, and a resin binder for negative electrode together with a solvent with the use of a kneader mixer. For example, water is employed as the solvent. For example, a planetary mixer may be employed as the kneader mixer.

(2) Both main surfaces of a negative electrode current collection foil are coated with the negative electrode composite material paste with the use of a die coater, followed by drying. The negative electrode composite material layer is thus formed.

(3) The negative electrode composite material layer is compressed with the use of a rolling machine. A thickness and a density of the negative electrode composite material layer are thus adjusted.

(4) The negative electrode current collection foil and the negative electrode composite material layer are cut into a prescribed dimension with the use of a slitter.

[Separator Manufacturing Step (S200)]

In the separator manufacturing step, a separator with a heat resistance layer is manufactured. The separator manufacturing step includes an inorganic particle crushing step (S201) and a heat resistance layer formation step (S202).

1. Inorganic Particle Crushing Step (S201)

In the inorganic particle crushing step, the inorganic particles are crushed with the use of a jet mill. The inorganic particles including an angular protruding portion are thus obtained. A condition for jet milling should only be adjusted as appropriate in accordance with a type or a physical property of the inorganic particles.

2. Heat Resistance Layer Formation Step (S202)

In the heat resistance layer formation step, the inorganic particles and the resin binder are uniformly dispersed in a solvent initially with the use of an emulsifying disperser. A paste to form a heat resistance layer is thus obtained. For example, water or NMP is employed as the solvent.

Then, a microporous film composed of PE and/or PP is prepared as a base material. The main surface of the base material is coated with the paste with the use of a gravure coater, followed by drying. The heat resistance layer is thus formed on the main surface of the base material. The heat resistance layer may be formed on one main surface of the base material or on both main surfaces of the base material.

[Electrode Assembly Manufacturing Step (S300)]

In the electrode assembly manufacturing step, an electrode assembly including the separator, the positive electrode plate, and the negative electrode plate is manufactured. The electrode assembly manufacturing step (S300) includes the stacking step (S301), the interposed layer formation step (S302), and the fixation step (S303).

1. Stacking Step (S301)

In the stacking step, an electrode composite material layer is stacked on the heat resistance layer. For example, as shown in FIG. 2, positive electrode plate 10 and negative electrode plate 20 are stacked with separator 40 having the heat resistance layer lying therebetween. Thus, the electrode composite material layer (at least any of the positive electrode composite material layer and the negative electrode composite material layer) opposed to the heat resistance layer is stacked on the heat resistance layer.

In the case of a wound electrode assembly, each member is subsequently further wound around an axis of winding Aw. A winding assembly is thus obtained. Here, foil exposure portion 11a, 21a is arranged at the end portion in a direction along axis of winding Aw. Tension applied to the separator during winding should only be, for example, approximately from 0.35 to 4.3 N/mm². Here, the tension refers to force applied per cross-sectional area of the separator.

2. Interposed Layer Formation Step (S302)

Figure 7:
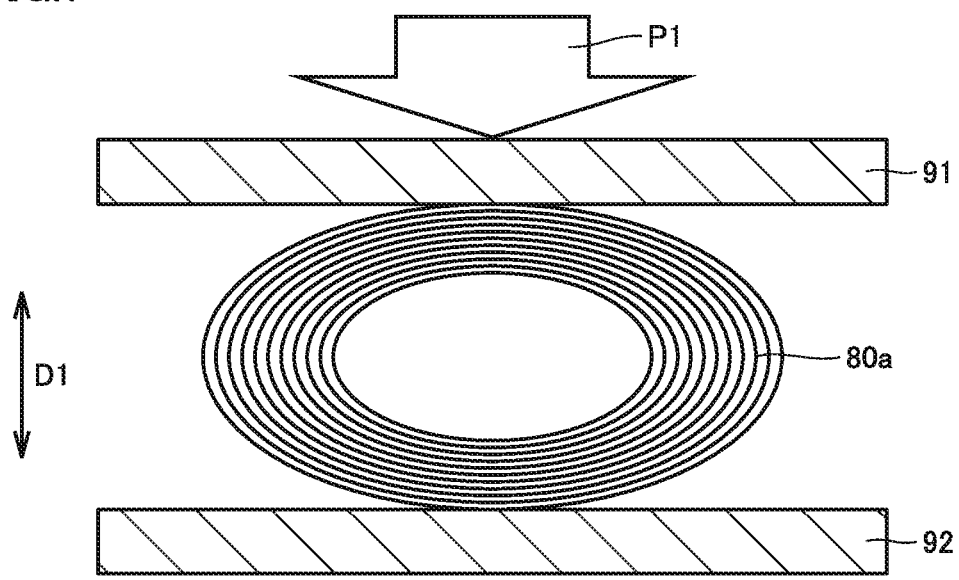
FIG. 7 is a schematic diagram illustrating an interposed layer formation step.

In the interposed layer formation step, the interposed layer is formed by applying a pressure in the direction of stack of the heat resistance layer and the electrode composite material layer. FIG. 7 is a schematic diagram illustrating the interposed layer formation step.

A winding assembly 80a obtained above is arranged between an upper mold 91 and a lower mold 92 of a parallel plate press. A pressure P1 is applied in direction of stack D1. Winding assembly 80a is thus pressed and formed to have a flat profile. Electrode assembly 80 is thus obtained. Here, the aforementioned interposed layer is formed as the heat resistance layer and the electrode composite material layer enter each other. Pressure P1 is preferably approximately from 0.5 to 5 MPa. Entry of the heat resistance layer and the electrode composite material layer into each other tends to occur in this pressure range. In this pressure range, an interposed layer is formed also in an R portion 80r (see FIG. 8) where a pressure is not directly applied from upper mold 91 or lower mold 92. A time period for holding pressurization may be, for example, approximately from 10 seconds to 30 minutes. A temperature during pressurization may be set to a room temperature. Namely, during pressurization, a temperature of upper mold 91 and lower mold 92 may be, for example, approximately from 10 to 30° C.

3. Fixation Step (S303)

Figure 8:
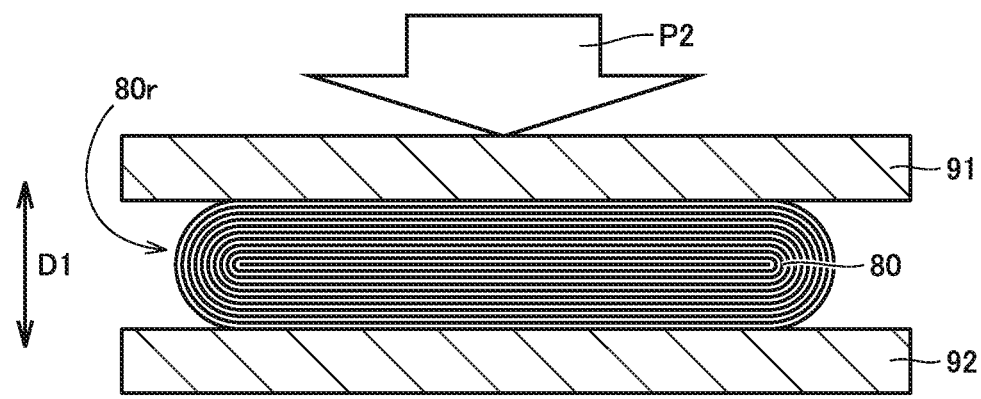
FIG. 8 is a schematic diagram illustrating a fixation step.

In the present embodiment, the fixation step is performed, following the interposed layer formation step. In the fixation step, the electrode assembly is held in an environment at a prescribed temperature while a prescribed pressure is applied in the direction of stack of the heat resistance layer and the electrode composite material layer. Thus, the interposed layer is fixed and adhesiveness between the separator and the electrode composite material layer is further higher. FIG. 8 is a schematic diagram illustrating the fixation step. As shown in FIG. 8, upper mold 91 and lower mold 92 are fixed with a jig such that a pressure P2 is applied to electrode assembly 80 in direction of stack D1. The interposed layer can be fixed, for example, by holding electrode assembly 80 in an oven set to a prescribed temperature in this state.

A condition for a pressure and a temperature in the fixation step is adjusted as appropriate in accordance with a type of a base material for the separator or a type of a resin binder contained in the heat resistance layer. In the fixation step in the present embodiment, for example, a condition for a pressure and a temperature as follows can be adopted. Pressure P2 is preferably not lower than 8 MPa and not higher than 20 MPa. When pressure P2 is excessively low, a desired fixation effect may not be obtained. When pressure P2 is excessively high, pores in the base material may collapse and a resistance of the battery may increase. The lower limit of pressure P2 is more preferably 9 MPa. The upper limit of pressure P2 is more preferably 16 MPa. A temperature is preferably not lower than 80° C. and not higher than 120° C. When a temperature in the fixation step is excessively low, a desired fixation effect may not be obtained. When a temperature is excessively high, a material forming the base material may melt to close the pores and a resistance of the battery may increase. The lower limit of the temperature is more preferably 90° C. The upper limit of the temperature is more preferably 110° C. A time period for holding in the fixation step is, for example, approximately from 10 seconds to 10 minutes.

[Case Accommodation Step (S400)]

In the case accommodation step, the electrode assembly is accommodated in a case. As shown in FIG. 1, electrode assembly 80 is connected to positive electrode terminal 70 and negative electrode terminal 72 and then accommodated in prismatic case 50.

[Liquid Injection Step (S500)]

In the liquid injection step, an electrolyte solution is injected into the prismatic case. The electrolyte solution is injected, for example, through a liquid injection port (not shown) provided in the prismatic case. Thereafter, the liquid injection port is sealed with prescribed means to thereby hermetically seal the prismatic case. The non-aqueous electrolyte secondary battery is completed as above.

[Battery Pack]

Figure 9:
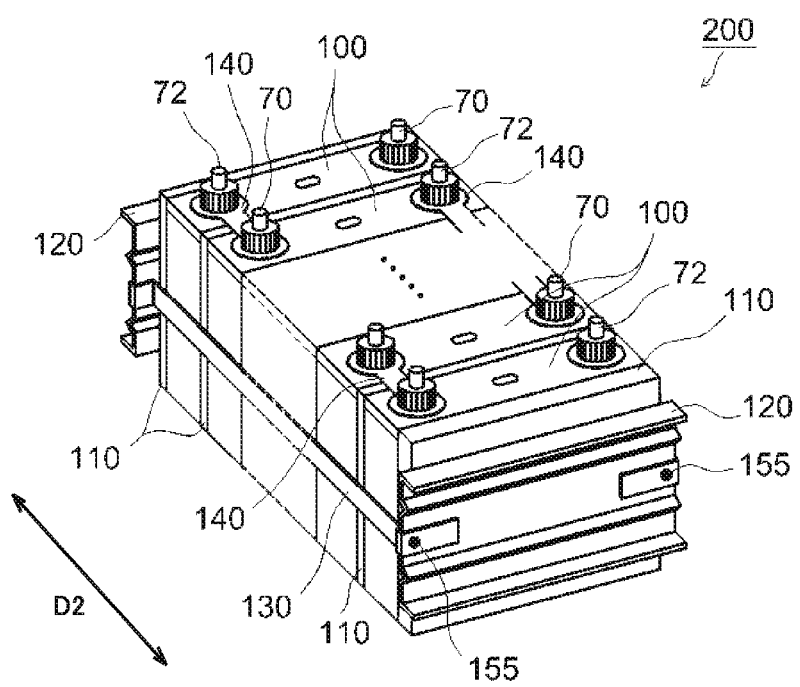
FIG. 9 is a schematic diagram showing one example of a construction of a battery pack.

Then, a battery pack including the non-aqueous electrolyte secondary battery as a cell will now be described. FIG. 9 is a schematic diagram showing one example of a construction of the battery pack. As shown in FIG. 9, a battery pack 200 includes a plurality of batteries 100 (cells). The number of cells included in the battery pack is changed as appropriate in accordance with a necessary voltage and an application. A plurality of batteries 100 are aligned in one direction such that positive electrode terminal 70 and negative electrode terminal 72 are alternately arranged, with orientations of adjacent batteries being reversed. A connection member 140 (bus bar) connects positive electrode terminal 70 of one battery 100 and negative electrode terminal 72 of battery 100 adjacent thereto to each other. A cooling plate 110 is interposed between adjacent batteries 100. Cooling plate 110 has, for example, projections and recesses like teeth of a comb on its surface.

Battery assembly 200 has a fastening member. The fastening member is constituted of a fastening plate 120, a fastening band 130, and a screw 155. Fastening plate 120 is arranged at both ends of a string of batteries 100. Fastening band 130 is attached to bridge between two fastening plates 120. By tightening an end portion of fastening band 130 with screw 155, the plurality of batteries 100 are fastened around their perimeters. A fastening pressure is thus generated in a direction of alignment D2 of batteries 100. Here, direction of alignment D2 of batteries 100 substantially coincides with direction of stack D1 described previously. A substantially equal fastening pressure is applied to each battery 100.

A fastening pressure is preferably not lower than 0.2 MPa and not higher than 8 MPa. By fastening the batteries within this pressure range, improvement in durability under high-load charging and discharging can be expected. When the fastening pressure is excessively low, an effect expected from fastening may lower. When the fastening pressure is excessively high, pores in the separator collapse and high-load charging and discharging characteristics may also lower. The lower limit of the fastening pressure is more preferably 0.6 MPa and particularly preferably 1.0 MPa. The upper limit of the fastening pressure is more preferably 3 MPa.

Since the non-aqueous electrolyte secondary battery and the battery pack including the same described above are excellent in durability under high-load charging and discharging, they are particularly suitable as a power supply for a vehicle.

EXAMPLES

Though the present embodiment will be described hereinafter with reference to Examples, the present embodiment is not limited thereto.

[Manufacturing of Non-Aqueous Electrolyte Secondary Battery]

Non-aqueous electrolyte secondary batteries according to samples Nos. 1 to 30 were fabricated as below. In Tables 2 to 4 which will be described later, a sample having a number to which "*" is appended such as "sample No. 1*" represents a comparative example and other samples represent Examples.

1. Electrode Plate Manufacturing Step (S100)

1-1. Positive Electrode Plate Manufacturing Step (S101)

Materials below were prepared.

Positive electrode active material particles: $LiNi_{1/3}Co_{1/3}Mn_{1/3}O_2$

Conductive material: AB

Resin binder for positive electrode: PVDF

Positive electrode current collection foil: Al foil (a thickness of 15 μm)

A positive electrode composite material paste was fabricated by mixing and kneading the positive electrode active material particles, the conductive material, and the resin binder for positive electrode in NMP with the use of a planetary mixer. A mass ratio among components was set to positive electrode active material particles:conductive material:resin binder for positive electrode=90:8:2.

The positive electrode composite material layer was formed by coating both main surfaces of the positive electrode current collection foil with the positive electrode composite material paste at a prescribed position with the use of a die coater, followed by drying. A thickness was adjusted by compressing the positive electrode composite material layer with the use of a rolling machine. A total thickness of the two positive electrode composite material layers and the positive electrode current collection foil was 70 μm.

A band-shaped positive electrode plate was obtained by cutting the positive electrode composite material layer and the positive electrode current collection foil into a prescribed dimension with the use of a slitter.

1-2. Negative Electrode Plate Manufacturing Step (S102)

Materials below were prepared.

Negative electrode active material particles: amorphous coated graphite

Thickener: CMC

Resin binder for negative electrode: SBR

Negative electrode current collection foil: Cu foil (a thickness of 10 μm)

A negative electrode composite material paste was fabricated by mixing and kneading the negative electrode active material particles, the thickener, and the resin binder for negative electrode in water with the use of a planetary mixer. A mass ratio among components was set to negative electrode active material particles:thickener:resin binder for negative electrode=98:1:1.

The negative electrode composite material layer was formed by coating both main surfaces of the negative electrode current collection foil with the negative electrode composite material paste at a prescribed position with the use of a die coater, followed by drying. A thickness was adjusted by compressing the negative electrode composite material layer with the use of a rolling machine. A total thickness of the two negative electrode composite material layers and the negative electrode current collection foil was 80 μm.

A band-shaped negative electrode plate was obtained by cutting the negative electrode composite material layer and the negative electrode current collection foil into a prescribed dimension with the use of a slitter.

2. Separator Manufacturing Step (S200)

Materials below were prepared.

Base material: microporous film shown in Tables 2 to 4

Inorganic particles: α alumina

Resin binder: resin binder shown in Tables 2 to 4

"PE" shown in a field of the base material in Tables 2 to 4 represents a base material (a thickness of 20 μm) having a single-layered structure formed from a PE microporous film. "PP/PE/PP" represents a base material (a thickness of 20 μm) having a three-layered structure obtained by stacking a PE microporous film and a PP microporous film in the given order. "PVDF, HFP" shown in a field of the resin binder represents use of the PVDF resin and the PVDF-HFP resin as being mixed. Similarly, "PVDF, PTFE, HFP" represents use of the PVDF resin, the PTFE resin, and the PVDF-HFP resin as being mixed.

2-1. Inorganic Particle Crushing Step (S201)

Powders of inorganic particles a to f were obtained by crushing powders of inorganic particles under respective conditions shown in Table 1 with the use of a jet mill. As shown in Table 1, inorganic particles b to e included angular protruding portions of which interior angle was not smaller than 10° and not greater than 90°.

TABLE 1

| | Interior Angle of Angular Protruding Portion ° (Degree) | Condition for Jet Milling | |
|---|---|---|---|
| | | Pressure MPa | Time min |
| Inorganic Particles a | 5 | 5.0 | 1 |
| Inorganic Particles b | 10 | 3.0 | 1 |
| Inorganic Particles c | 30 | 2.0 | 1 |
| Inorganic Particles d | 60 | 1.0 | 1 |
| Inorganic Particles e | 90 | 0.7 | 2 |
| Inorganic Particles f | 100 | 0.3 | 5 |

2-2. Heat Resistance Layer Formation Step (S202)

A paste to form a heat resistance layer was fabricated by uniformly dispersing the inorganic particles and the resin binder in a prescribed solvent with the use of "Clearmix" manufactured by M Technique Co., Ltd.

The heat resistance layer was formed by coating one main surface or both main surfaces of the base material with the paste with the use of a gravure coater, followed by drying.

3. Electrode Assembly Manufacturing Step (S300)

3-1. Stacking Step (S301)

As shown in FIG. 2, positive electrode plate 10 and negative electrode plate 20 were stacked with separator 40 lying therebetween. The electrode composite material layer was thus stacked on the heat resistance layer. A winding assembly was fabricated by further winding each member around axis of winding Aw.

For samples Nos. 1 to 24, the separator in which the heat resistance layer was formed on one main surface of the base material was employed, and the heat resistance layer faced the positive electrode composite material layer.

For samples Nos. 25 to 27, the separator in which the heat resistance layer was formed on one main surface of the base material was employed, and the heat resistance layer faced the negative electrode composite material layer.

For samples Nos. 28 to 30, the separator in which the heat resistance layer was formed on both main surfaces of the base material was employed. In these samples, one heat resistance layer faced the positive electrode composite material layer and the heat resistance layer which was opposite to the former with the base material being interposed faced the negative electrode composite material layer.

3-2. Interposed Layer Formation Step (S302)

As shown in FIG. 7, winding assembly 80a was formed to have a flat profile by applying pressure P1 in direction of stack D1 with the use of a parallel plate press. Electrode assembly 80 was thus obtained. Electrode assembly 80 includes an interposed layer between the heat resistance layer and the electrode composite material layer. Pressure P1 was set to 2 MPa.

In the present experiment, a height H80 of electrode assembly 80 shown in FIG. 1 was set to 50 mm and a width W80 was set to 130 mm. The total number of stacked separators in direction of stack D1 was set to 130.

3-3. Fixation Step (S303)

For samples Nos. 10 to 30, the fixation step was performed, following the interposed layer formation step. Conditions for fixation in the present experiment are shown in Tables 2 to 4. Presence/absence of the interposed layer and a thickness of the interposed layer in each sample were checked in accordance with the method described previously.

4. Case Accommodation Step (S400)

As shown in FIG. 1, positive electrode terminal 70 and negative electrode terminal 72 were connected to electrode assembly 80, and then electrode assembly 80 was accommodated in prismatic case 50.

5. Liquid Injection Step (S500)

A mixed solvent was obtained by mixing aprotic solvents at a volume ratio of EC:EMC:DMC=3:3:4. $LiPF_6$ (1.1 mol/L), LiBOB, and $Li[PO_2F_2]$ were dissolved in the mixed solvent. The electrolyte solution was thus obtained.

A prescribed amount of electrolyte solution was injected through the liquid injection port of the prismatic case. Thereafter, the prismatic case was hermetically sealed by sealing the liquid injection port.

The non-aqueous electrolyte secondary battery according to each sample was manufactured as above. A composition of each sample is shown in Tables 2 to 4.

TABLE 2

| Sample No. | Separator | | | | | Interposed Layer Condition for Fixation | |
|---|---|---|---|---|---|---|---|
| | Base Material Type | Heat Resistance Layer | | | | | |
| | | Interior Angle of Angular Protruding Portion of Inorganic Particles ° (Degree) | Resin Binder | | Thickness μm | Pressure MPa | Temperature ° C. |
| | | | Type | Mass % | | | |
| 1* | PE | 100 | Acrylic | 50 | 0.8 | — | — |
| 2 | PP/PE/PP | 90 | PVDF, HFP | 50 | 0.8 | — | — |
| 3 | PE | 30 | Acrylic | 50 | 0.8 | — | — |
| 4 | PE | 10 | Acrylic | 50 | 0.8 | — | — |
| 5* | PP/PE/PP | 5 | Acrylic | 50 | 0.8 | — | — |
| 6 | PE | 60 | Acrylic | 30 | 2.3 | — | — |
| 7 | PP/PE/PP | 60 | Acrylic | 40 | 2.3 | — | — |
| 8 | PE | 60 | PVDF | 55 | 2.3 | — | — |
| 9 | PE | 60 | Acrylic | 70 | 2.3 | — | — |

| Sample No. | Interposed Layer Ratio of Thickness of Interposed Layer to Thickness of Base Material % | Electrode Composite Material Layer Electrode Composite Material Layer Opposed To Heat Resistance Layer | Battery Fastening Pressure MPa | Durability Test Rate of Increase in Resistance % |
|---|---|---|---|---|
| 1* | 0.5 | Positive Electrode Composite Material Layer | 1.0 | 120 |
| 2 | 1 | Positive Electrode Composite Material Layer | 1.0 | 54 |
| 3 | 3 | Positive Electrode Composite Material Layer | 1.0 | 55 |
| 4 | 5 | Positive Electrode Composite Material Layer | 1.0 | 56 |
| 5* | 7 | Positive Electrode Composite Material Layer | 1.0 | 130 |
| 6 | 2 | Positive Electrode Composite Material Layer | 1.2 | 61 |
| 7 | 2 | Positive Electrode Composite Material Layer | 1.2 | 59 |
| 8 | 2 | Positive Electrode Composite Material Layer | 1.2 | 57 |
| 9 | 2 | Positive Electrode Composite Material Layer | 1.2 | 60 |

TABLE 3

| Sample No. | Separator - Base Material Type | Heat Resistance Layer - Interior Angle of Angular Protruding Portion of Inorganic Particles ° (Degree) | Heat Resistance Layer - Resin Binder Type | Heat Resistance Layer - Resin Binder Mass % | Heat Resistance Layer - Thickness μm | Interposed Layer Condition for Fixation - Pressure MPa | Interposed Layer Condition for Fixation - Temperature ° C. |
|---|---|---|---|---|---|---|---|
| 10* | PE | 60 | Acrylic | 53 | 4.2 | 9 | 125 |
| 11 | PE | 60 | Acrylic | 53 | 4.2 | 9 | 120 |
| 12 | PE | 60 | PVDF, HFP | 53 | 4.2 | 16 | 100 |
| 13 | PE | 60 | Acrylic | 53 | 4.2 | 20 | 80 |
| 14* | PE | 60 | Acrylic | 53 | 4.2 | 22 | 70 |
| 15 | PE | 60 | Acrylic | 58 | 6.0 | 6 | 100 |
| 16 | PE | 60 | Acrylic | 58 | 6.0 | 6 | 100 |
| 17 | PE | 60 | Acrylic | 58 | 6.0 | 6 | 100 |
| 18 | PE | 60 | Acrylic | 58 | 6.0 | 6 | 100 |
| 19 | PE | 60 | Acrylic | 58 | 6.0 | 6 | 100 |

| Sample No. | Interposed Layer Ratio of Thickness of Interposed Layer to Thickness of Base Material % | Electrode Composite Material Layer Electrode Composite Material Layer Opposed to Heat Resistance Layer | Battery Fastening Pressure MPa | Durability Test Rate of Increase in Resistance % |
|---|---|---|---|---|
| 10* | 6 | Positive Electrode Composite Material Layer | 3.0 | 101 |
| 11 | 4.5 | Positive Electrode Composite Material Layer | 3.0 | 36 |
| 12 | 2.2 | Positive Electrode Composite Material Layer | 3.0 | 31 |
| 13 | 2.1 | Positive Electrode Composite Material Layer | 3.0 | 34 |
| 14* | 6.5 | Positive Electrode Composite Material Layer | 3.0 | 100 |
| 15 | 2.3 | Positive Electrode Composite Material Layer | 0.1 | 67 |
| 16 | 2.3 | Positive Electrode Composite Material Layer | 0.2 | 35 |
| 17 | 2.3 | Positive Electrode Composite Material Layer | 2.0 | 23 |
| 18 | 2.3 | Positive Electrode Composite Material Layer | 8.0 | 32 |
| 19 | 2.3 | Positive Electrode Composite Material Layer | 10.0 | 70 |

TABLE 4

| Sample No. | Separator - Base Material Type | Heat Resistance Layer - Interior Angle of Angular Protruding Portion of Inorganic Particles ° (Degree) | Heat Resistance Layer - Resin Binder Type | Heat Resistance Layer - Resin Binder Mass % | Heat Resistance Layer - Thickness μm | Interposed Layer Condition for Fixation - Pressure MPa | Interposed Layer Condition for Fixation - Temperature ° C. |
|---|---|---|---|---|---|---|---|
| 20 | PE | 60 | Acrylic | 62 | 5.0 | 13 | 105 |
| 21 | PP/PE/PP | 60 | Aramid-Based | 62 | 5.0 | 13 | 105 |
| 22 | PE | 60 | PVDF | 62 | 5.0 | 13 | 105 |
| 23 | PE | 60 | PVDF, HFP | 62 | 5.0 | 13 | 105 |
| 24 | PE | 60 | PVDF, PTFE, HFP | 62 | 5.0 | 13 | 105 |
| 25 | PE | 60 | PVDF | 62 | 5.0 | 13 | 105 |
| 26 | PE | 60 | PVDF, HFP | 62 | 5.0 | 13 | 105 |
| 27 | PE | 60 | PVDF, PTFE, HFP | 62 | 5.0 | 13 | 105 |
| 28 | PP/PE/PP | 60 | PVDF | 62 | 5.0 | 13 | 105 |
| 29 | PP/PE/PP | 60 | PVDF, HFP | 62 | 5.0 | 13 | 105 |
| 30 | PP/PE/PP | 60 | PVDF, PTFE, | 62 | 5.0 | 13 | 105 |

TABLE 4-continued

HFP

| Sample No. | Interposed Layer Ratio of Thickness of Interposed Layer to Thickness of Base Material % | Electrode Composite Material Layer Electrode Composite Material Layer Opposed to Heat Resistance Layer | Battery Fastening Pressure MPa | Durability Test Rate of Increase in Resistance % |
|---|---|---|---|---|
| 20 | 2.9 | Positive Electrode Composite Material Layer | 0.6 | 30 |
| 21 | 2.9 | Positive Electrode Composite Material Layer | 0.6 | 20 |
| 22 | 3.1 | Positive Electrode Composite Material Layer | 0.6 | 10 |
| 23 | 3.1 | Positive Electrode Composite Material Layer | 0.6 | 8 |
| 24 | 3.2 | Positive Electrode Composite Material Layer | 0.6 | 9 |
| 25 | 3.2 | Negative Electrode Composite Material Layer | 0.6 | 11 |
| 26 | 3.3 | Negative Electrode Composite Material Layer | 0.6 | 9 |
| 27 | 3.3 | Negative Electrode Composite Material Layer | 0.6 | 10 |
| 28 | 3.2 | Positive Electrode Composite Material Layer Negative Electrode Composite Material Layer | 0.6 | 16 |
| 29 | 3.2 | Positive Electrode Composite Material Layer Negative Electrode Composite Material Layer | 0.6 | 14 |
| 30 | 3.3 | Positive Electrode Composite Material Layer Negative Electrode Composite Material Layer | 0.6 | 15 |

[Durability Test]

Durability of each battery obtained above was evaluated by repeating high-load charging and discharging. In the present experiment, charging and discharging was repeated assuming use as a battery pack, while a fastening pressure shown in Tables 2 to 4 was applied to the battery with the use of a prescribed fastening jig. Specifically, such charging and discharging that combination of "charging→rest→discharging" under a condition below was defined as one cycle was repeated 1000 times.

Charging: 2.5 C×240 seconds
Rest: 120 seconds
Discharging: 30 C×20 seconds

A resistance of the battery was measured before and after the test, and a rate of increase in resistance (%) was calculated based on an expression (I) below:

$$\{(\text{Resistance After Test}) - (\text{Resistance Before Test})\} \div (\text{Resistance Before Test}) \times 100 \qquad (I).$$

Tables 2 to 4 show results. A lower rate of increase in resistance indicates better durability under high-load charging and discharging.

[Results and Discussion]

It can be found from Tables 2 to 4 that samples including the interposed layer between the heat resistance layer and the electrode composite material layer, of which ratio of thickness of the interposed layer to the thickness of the base material is not lower than 1% and not higher than 5% are better in durability under high-load charging and discharging than the samples failing to satisfy such a condition.

It can also be found that durability tends to improve as the method of manufacturing a non-aqueous electrolyte secondary battery includes the step of fixing the interposed layer under such a condition as a pressure not lower than 8 MPa and not higher than 20 MPa and a temperature not lower than 80° C. and not higher than 120° C.

It can be found based on the results of samples Nos. 1 to 5 in Table 2 that durability tends to improve as the inorganic particles include the angular protruding portion of which interior angle is not smaller than 10° and not greater than 90°.

It can be found based on the results of samples Nos. 6 to 9 in Table 2 that durability tends to improve as the heat resistance layer contains 30 mass % or more and 70 mass % or less of the resin binder.

It can be found based on the results of samples Nos. 15 to 19 in Table 3 that durability tends to improve as the batteries are fastened at a fastening pressure not lower than 0.2 MPa and not higher than 8 MPa.

It can be found from Tables 2 to 4 that durability tends to improve as the heat resistance layer contains the PVDF resin.

Though an embodiment of the present invention has been described, the embodiment disclosed herein is illustrative and non-restrictive in every respect. The scope of the present invention is defined by the terms of the claims and is intended to include any modifications within the scope and meaning equivalent to the terms of the claims.

What is claimed is:

1. A non-aqueous electrolyte secondary battery, comprising:
   a separator including a base material and a heat resistance layer formed on at least one main surface of said base material and containing inorganic particles and a resin binder;

an electrode composite material layer stacked on said heat resistance layer and containing electrode active material particles; and an interposed layer interposed between said heat resistance layer and said electrode composite material layer, in said interposed layer, said inorganic particles, said resin binder, and said electrode active material particles being present as being mixed, and a ratio of a thickness of said interposed layer to a thickness of said base material being not lower than 1% and not higher than 5%.

2. The non-aqueous electrolyte secondary battery according to claim 1, wherein said inorganic particles include an angular protruding portion of which interior angle is not smaller than 10° and not greater than 90°, and said heat resistance layer contains 30 mass % or more and 70 mass % or less of said resin binder.

3. A method of manufacturing the non-aqueous electrolyte secondary battery according to claim 1, comprising the steps of:

stacking said electrode composite material layer on said heat resistance layer; and holding a stack of said heat resistance layer and said electrode composite material layer in an environment at a temperature not lower than 80° C. and not higher than 120° C. while a pressure not lower than 8 MPa and not higher than 20 MPa is applied in a direction of stack of said heat resistance layer and said electrode composite material layer.

* * * * *